Sept. 29, 1936.     A. H. STEWART     2,055,676
GLASS FEEDING METHOD AND APPARATUS
Filed Sept. 19, 1932
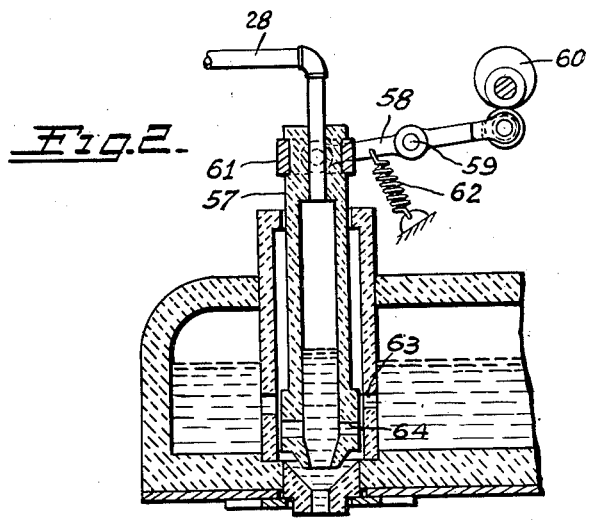
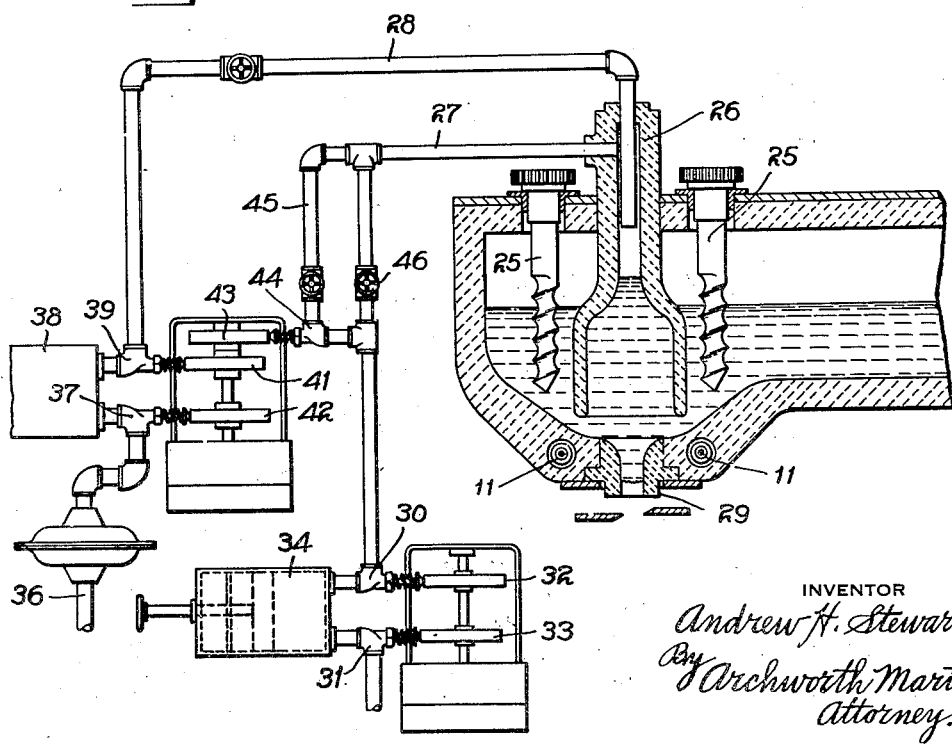
INVENTOR
Andrew H. Stewart,
By Archworth Martin,
Attorney.

Patented Sept. 29, 1936

2,055,676

UNITED STATES PATENT OFFICE 2,055,676

GLASS FEEDING METHOD AND APPARATUS

Andrew H. Stewart, Shields, Pa., assignor to The Phoenix Glass Company, Monaca, Pa., a corporation of West Virginia Application September 19, 1932, Serial No. 633,740

6 Claims. (Cl. 49—55)

The invention relates to that class of apparatus wherein measured charges of glass are supplied from a furnace boot or fore-hearth, through an orifice located in the bottom of the boot, but it will be understood that certain features of the invention are applicable also to other types of apparatus.

In the realm of glass manufacture, particularly to that division of the industry that has to do with the manufacture of glass containers, bottles, and a variety of small articles made by machine production, a great deal of time and effort has been spent on how best to deliver glass from a furnace or tank to the mold in which the article is to be made or formed.

Numerous patents have been issued covering this particular phase in the manufacture of glass articles of the above description. In each instance of gob feeding as opposed to vacuum machines, we find a boot or forehearth attached to the tank and extending therefrom, to segregate a small body of glass from the main body. These boots or forehearths are of varying lengths and widths and are for the purpose mainly of conditioning glass before pushing a gob out through an orifice and thence into the mold. In other words, the temperature and consequent viscosity is an important element in the handling of glass, more so even for machine production than for hand production.

Each article has an optimum temperature or viscosity requirement in the glass gob, and variations from this optimum lead to inferior results. Since this requirement of viscosity is so important, extended efforts have been made in the building of forehearths and the treatment of glass in the forehearth to get desired results. We find both cooling by wind and heating by burners, with sometimes both going on at the same time in a boot, in an effort to "condition" the glass. With attention to the wind and the burners good results are obtained, but the use of such drastic opposing forces illustrates clearly that there is much room for improvement, in either the boot itself or in a better control of the glass gob that issues therefrom to the mold.

In the delivery of mold charges from a furnace boot, it is common practice to allow the molten glass to flow downwardly through a flow ring, shears being provided to divide the glass stream into mold charges, or to sever suspended masses of glass at the underside of the flow ring.

Owing to the difficulty of maintaining uniform temperature in the body of molten glass at the vicinity of the flow ring or discharge orifice, glass which flows through the ring and is temporarily suspended from the ring, preliminary to shearing the same, may hang unevenly, because a portion of the glass moving through the ring may be colder than other portions of the glass, with the result that the colder glass will retard flow at one side of the gob while the more fluid glass at the other side of the gob will tend to move more rapidly, so that the gob is thrown out of balance and rendered unsymmetrical in form. For example, the glass at the extreme end of the boot will ordinarily be somewhat colder than the glass nearer to the refining hearth.

Heretofore application of burners in the space above the glass in the forehearth has been resorted to in an effort to prepare the glass for feeding, the burners being so arranged as to direct heat where it tends to compensate most for loss due to radiation and slow movement of glass. Sometimes wind is employed to cool the glass in the forehearth and the cooled glass afterwards heated by burner application when required. But any arrangement of cooling and heating devices at the surface of the glass cannot give positive control of glass stream emerging at the orifice, especially as the glass so emerging is coming from the bottom, sides and middle of the bath adjacent to the orifice. With a given set of conditions relative to wind and burner control, there may be variation and distortion in the gob, depending on the movement of glass near, at and through the orifice.

Another problem arising from the use of the said types of glass feeders is that of the creation of "cords" or "waves" in the mold charges, because of the said differences in temperature of the glass which passes through the flow ring. For instance, the glass on the bottom surface of the boot may be chilled somewhat relative to the other glass, and the glass at the foremost end of the boot may be chilled somewhat, as above set forth. The result is that visible lines of division are produced in the glass charge, as between the hotter and colder portions thereof.

Again, in those cases where the molten glass flows mainly from the bottom wall of the boot to the flow ring, there is experienced some difficulty in control, not only of the flow, but the temperature of the glass at such zone may differ considerably from the temperatures in other portions of the body of molten glass, and there is consequently a more difficult problem of temperature control.

While stirring devices have been provided for correcting some of the objections above-referred to, said devices interfere with the proper flow of glass through the orifice and prevent uniformity of flow, by reason of the swirling movement of the glass body, drawing together hotter and colder portions of glass from different parts of the bath.

My invention has for its objects the elimination of the objectionable conditions above-enumerated, as well as the securing of various other advantages, as will hereinafter be explained in detail.

Some of the forms of apparatus by which my invention may be practised are shown in the accompanying drawing wherein Figure 1 is a longitudinal sectional view through a glass furnace boot, together with certain of the feeding apparatus; and Fig. 2 shows a modification of the structure of Fig. 1, but including a valve device for controlling flow from the pool into the bell.

In Fig. 1, I show a forehearth 5 and a flow ring 6, together with electrical resistor coils 11 for heating the glass and thus causing circulation of the glass in general vertical paths at the side of the bell, and also means for positively circulating the glass. The last-named means consists of screws 25 of refractory material that are driven in any suitable manner. The screws 25 may operate in the same direction to set up vertical currents of glass at opposite sides of the bell, and thereby maintain uniform temperature throughout the body of the glass in the vicinity of the orifice. These screws also may be operated in opposite directions, if desired, so that they will cooperate to produce a circulation of glass in a vertical plane entirely around the bell. Obviously, the screws could be applied also to the boot of Fig. 2.

In lieu of the heaters 11 and the screws 25 I may effect circulation of the glass in vertical directions by various other means, such as a hollow shaft that is open at its bottom and near its top, and which has internal screw threads.

Control of flow of glass from the orifice in Fig. 1 is effected by varying the air pressure within the upper portion of the bell 26. A vacuum line 27 and a pressure line 28 have communication with the upper portion of the bell, and movement of air within these lines is controlled by suitable valves and cam discs, as hereinafter explained. Glass is drawn into the bell, and flow through the orifice 29 is interrupted, by cutting off the supply of pressure through the pipe 28 and creating a vacuum in the pipe 27, while feeding impulses are, of course, imparted by the shutting off of the vacuum and the application of pressure.

The vacuum line is primarily controlled by valves 30 and 31 that are operated by cams 32 and 33, respectively, which are driven in timed relation to the movement of the mold table or the like that receives the charges of glass. A chamber 34 having an adjustable piston-like end wall 34a is provided in the vacuum line, so that with the valves 30 and 31 operating non-synchronously there may be more delicate control of the degree of the vacuum created within the bell.

For example, if the valve 30 is closed while the valve 31 is open, closing of the valve 31 and opening of the valve 30 will then create a predetermined degree of vacuum within the bell 26, this operation causing an equalization of pressures between the chamber 34 and the bell 26. The foregoing condition, of course, assumes that flow of pressure through the pipe 28 has been cut off.

Air pressure is supplied from a pressure line 36, past a valve 37, through a chamber 38 that corresponds to the chamber 34, and past a valve 39. The valves 37 and 39 are controlled by cams 42 and 41, respectively, which are operated in timed relation to a mold table or the like. The shaft which carries these cams also carries a cam 43, which controls a valve 44 in a vacuum by-pass line 45.

Assuming that it is desired to impart suction and discharge impulses to the glass, pressure is admitted to the bell past the valves 37 and 39. If the valves 37 and 39 are completely opened, and the vacuum lines completely closed, there will, of course, be a full discharge impulse exerted within the bell.

The force of the impulse can be controlled in various ways. For example, if the valve 37 is open to permit full line pressure within the chamber 38, and is then closed, opening of the valve 39 will permit expansion of the pressure in the chamber 38 into the bell. The pressure thereby created in the bell will, of course, depend upon the area of the chamber 38, which may vary as in the case of the chamber 34.

Pressure conditions within the bell can, of course, be very widely controlled by adjusting the timed relation between the various cams, and the adjustment of the chamber areas 34 and 38.

An additional control is effected by the cam 43 and the valve 44. If the valve 46 be closed, or partially closed, there will be a vacuum condition created within the by-pass pipe 45, so that flow through the pipe 27 can be partially or wholly controlled by the valve 44, which has a closer and more definite operative relation to the valves 37 and 39 than do the valves 30 and 31.

Referring to Fig. 2, I show a structure wherein a bell 57 is mechanically moved by a lever 58 which is fulcrumed at 59 and is oscillated by a cam 60, the inner end of the lever 58 being pivotally connected to a collar 61 that is set within a groove in the upper end of the bell 57. A spring 62 tends to retain the inner end of the lever and the bell in their lowermost positions.

In this structure, communication between the passageways 63 and 64 in the bell-enclosing chamber and the bell respectively, are out of registry when the bell 57 is in its lowermost position. Fluid pressure may then be created within the bell to force a charge of glass to the flow ring. At this time, the cam 60 causes the bell to rise and bring the ports 63 and 64 into registry, to permit glass to flow into the bell or be drawn therein by vacuum. Upon downward movement of the bell, fluid pressure is supplied thereto to effect another feeding movement of glass to the flow ring. Suction may be created within the bell immediately after the feeding operation in order to draw back the glass that remains in the flow ring.

I claim as my invention:

1. The step in the feeding of molten glass from an orifice in the bottom of a boot, which comprises positively effecting circulation of the glass in the vicinity of the orifice in approximately vertical paths only.

2. The combination with a glass furnace boot or the like having a discharge orifice, of means for positively effecting circulation of the molten glass in only vertical paths, at the vicinity of the said orifice.

3. The combination with a glass furnace boot or the like having a discharge orifice, of means, at diametrically opposite points with respect to the path of discharge, for positively effecting circulation of the molten glass in only vertical paths above said orifice.

4. The combination with a glass furnace boot or the like having a discharge orifice at its lower side, of a bell member disposed above said orifice, a housing member for the bell, one of said members having its lower edge engaging the bottom of the boot, and the said members being provided with ports in their sides at points below the pool level in the boot, and means for shifting the bell vertically to periodically bring its port into registry with the port of the housing.

5. The step in the feeding of molten glass from an orifice in the bottom of a boot, which comprises positively effecting circulation of the glass in the vicinity of the orifice only in approximately vertical paths, disposed at opposite sides of the axis of said orifice.

6. The steps in the feeding of molten glass from an orifice in the bottom of a boot, which comprise positively effecting circulation of glass in approximately vertical paths at points in the vicinity of said orifice, and effecting intermittent flow through the orifice in a path segregated from the first-named paths.

ANDREW H. STEWART.